(12) United States Patent
Wietfeldt et al.

(10) Patent No.: US 8,379,551 B2
(45) Date of Patent: Feb. 19, 2013

(54) RADIO SELECTION IN A MULTI-RADIO DEVICE

(75) Inventors: Richard Dominic Wietfeldt, San Diego, CA (US); Dong-an Zhang, Plano, TX (US); George Chrisikos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 12/822,026

(22) Filed: Jun. 23, 2010

(65) Prior Publication Data

US 2011/0149764 A1 Jun. 23, 2011

Related U.S. Application Data

(60) Provisional application No. 61/234,950, filed on Aug. 18, 2009.

(51) Int. Cl.
*H04L 27/04* (2006.01)
(52) U.S. Cl. ........................................ 370/310; 370/349
(58) Field of Classification Search .................. 370/252, 370/270, 310, 332, 333, 349; 455/525, 445, 455/561
See application file for complete search history.

(56) References Cited

U.S. PATENT DOCUMENTS

| | | | | |
|---|---|---|---|---|
| 5,832,368 A * | 11/1998 | Nakano et al. | ............... | 455/63.1 |
| 5,873,047 A * | 2/1999 | Nakano et al. | ................ | 455/561 |
| 5,978,657 A * | 11/1999 | Suzuki | ........................... | 455/522 |
| 7,003,311 B2 * | 2/2006 | Ebata et al. | ................... | 455/525 |
| 7,493,087 B2 * | 2/2009 | Dillon | ........................ | 455/63.1 |
| 7,606,569 B2 * | 10/2009 | Hori et al. | ...................... | 455/436 |
| 2005/0037798 A1 * | 2/2005 | Yamashita et al. | ............ | 455/525 |
| 2006/0193295 A1 | 8/2006 | White et al. | | |
| 2007/0255797 A1 | 11/2007 | Dunn et al. | | |
| 2008/0102815 A1 | 5/2008 | Sengupta et al. | | |
| 2009/0233594 A1 * | 9/2009 | Duschesne et al. | ........... | 455/423 |
| 2010/0311374 A1 * | 12/2010 | Sreerama et al. | .......... | 455/226.3 |

FOREIGN PATENT DOCUMENTS

| | | |
|---|---|---|
| CA | 2653862 | 11/2006 |
| EP | 1589781 | 10/2005 |
| WO | WO2006123916 | 11/2006 |

OTHER PUBLICATIONS

International Search Report and Written Opinion-PCT/US2010/045932, International Search Authority-European Patent Office-Nov. 25, 2010.

* cited by examiner

*Primary Examiner* — Brenda H Pham
(74) *Attorney, Agent, or Firm* — Rupit M. Patel

(57) ABSTRACT

Techniques for supporting communication by a wireless device having a set of radios and supporting a set of applications are described. In an aspect, radio selection may be performed based on interference information and additional information to obtain good performance. In one design, a plurality of radios available for use on the wireless device may be identified. Interference information indicative of interference between the plurality of radios may be obtained, e.g., from an interference database or a converted interference database. Additional information used for radio selection may also be obtained and may include information for communication profiles, communication preferences, application requirements, radio capabilities, etc. At least one radio may be selected for use for communication from among the plurality of radios based on the interference information and the additional information.

36 Claims, 8 Drawing Sheets

| Radio Tech | | | Transmitter Radio (Aggressor) | | | | | | | | | | | | | | | |
|---|---|---|---|---|---|---|---|---|---|---|---|---|---|---|---|---|---|---|
| | | | LTE/E-UTRA | | | | | | | | | | Bluetooth | | FM TX | | WLAN | |
| | | Freq | 824-849 | | 2500-2570 | | 2570-2620 | | 2620-2690 | | 2400-2484 | | 88-108 | | 2400-2484 | | | |
| | | Scenario | Sen | Nom | Sen | Nom | Sen | Nom | Sen | Nom | Sen | Nom | Sen | Nom | Sen | Nom | | |
| Radio Tech | Freq | Perf | | | | | | | | | | | | | | | | |
| LTE/E-UTRA | 2300-2400 | Green | | | | | | | | | 100% | 100% | | | 100% | 100% | | |
| | | Yellow | | | | | | | | | 0% | 0% | | | 0% | 0% | | |
| | | Red | | | | | | | | | 0% | 0% | | | 0% | 0% | | |
| | 2570-2620 | Green | | | | | | | | | 100% | 100% | | | 35% | 91% | | |
| | | Yellow | | | | | | | | | 0% | 0% | | | 55% | 0% | | |
| | | Red | | | | | | | | | 0% | 0% | | | 10% | 9% | | |
| | 2620-2690 | Green | | | | | | | | | 47% | 70% | | | 28% | 47% | | |
| | | Yellow | | | | | | | | | 10% | 12% | | | 19% | 8% | | |
| | | Red | | | | | | | | | 43% | 18% | | | 53% | 45% | | |
| Bluetooth | 2400-2484 | Green | | | 0% | 0% | 0% | 0% | 0% | 72% | | | | | | | | |
| | | Yellow | | | 0% | 89% | 0% | 100% | 0% | 3% | | | | | | | | |
| | | Red | | | 100% | 5% | 100% | 0% | 100% | 25% | | | | | | | | |
| | | | | | | 6% | | | | | | | | | | | | |
| FM RX | 88-108 | Green | | | | | | | | | | | | | | | | |
| | | Yellow | | | | | | | | | | | | | | | | |
| | | Red | | | | | | | | | | | | | | | | |
| WLAN | 2400-2484 | Green | | | 0% | 84% | 0% | 100% | 0% | 80% | | | | | | | | |
| | | Yellow | | | 0% | 1% | 0% | 0% | 100% | 5% | | | | | | | | |
| | | Red | | | 100% | 15% | 100% | 0% | 0% | 15% | | | | | | | | |
| GPS | 1575 | Green | 100% | | | | | | | | 100% | 100% | | | 100% | 100% | | |
| FLO | 716-722 | | | | | | | | | | | | | | | | | |
| | 722-728 | | | | | | | | | | | | | | | | | |

Performance for one band combination — 410

FIG. 4

RADIO SELECTION IN A MULTI-RADIO DEVICE

The present application claims priority to provisional U.S. Application Ser. No. 61/234,950, entitled "COEXISTENCE-ASSISTED SYSTEM SELECTION FOR MULTI RADIO OPERATION," filed Aug. 18, 2009, assigned to the assignee hereof and incorporated herein by reference.

BACKGROUND

I. Field

The present disclosure relates generally to communication, and more specifically to techniques for supporting communication by a wireless communication device.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication device may include a number of radios to support communication with different wireless communication networks. The wireless device may also support a number of applications, which may have different requirements. It may be desirable to support communication for active applications on the wireless device such that good performance can be achieved.

SUMMARY

Techniques for supporting communication by a wireless device are described herein. The wireless device may include a set of radios that can support radio communication. Any number of radios and any one of the radios may be available at any given moment. The wireless device may also support a set of applications. Any number of applications and any one of the applications may be active at any given moment.

In an aspect, radio selection may be performed based on interference information and additional information to obtain good performance. In one design, a plurality of radios available for use on the wireless device may be identified, e.g., by a connection manager within the wireless device. Interference information indicative of interference between the plurality of radios may be obtained. Additional information used for radio selection may also be obtained and may comprise information for communication profiles, communication preferences, application requirements, radio capabilities, etc. At least one radio may be selected for use for communication from among the plurality of radios based on the interference information and the additional information.

In one design, an interference database may store information on interference conditions for the set of radios on the wireless device. The interference database may be converted to a converted interference database, which may have a form that may be more readily or easily used for radio selection. The conversion may be performed when needed (e.g., when radio selection is performed), or periodically at a predetermined rate, and/or when interference conditions for the set of radios meet predefined criteria. The interference information may be obtained based on the converted interference database.

Various aspects and features of the disclosure are described in further detail below.

BRIEF DESCRIPTION OF THE DRAWINGS

FIG. 4 shows an exemplary color chart comprising interference information.

DETAILED DESCRIPTION

Figure 1:
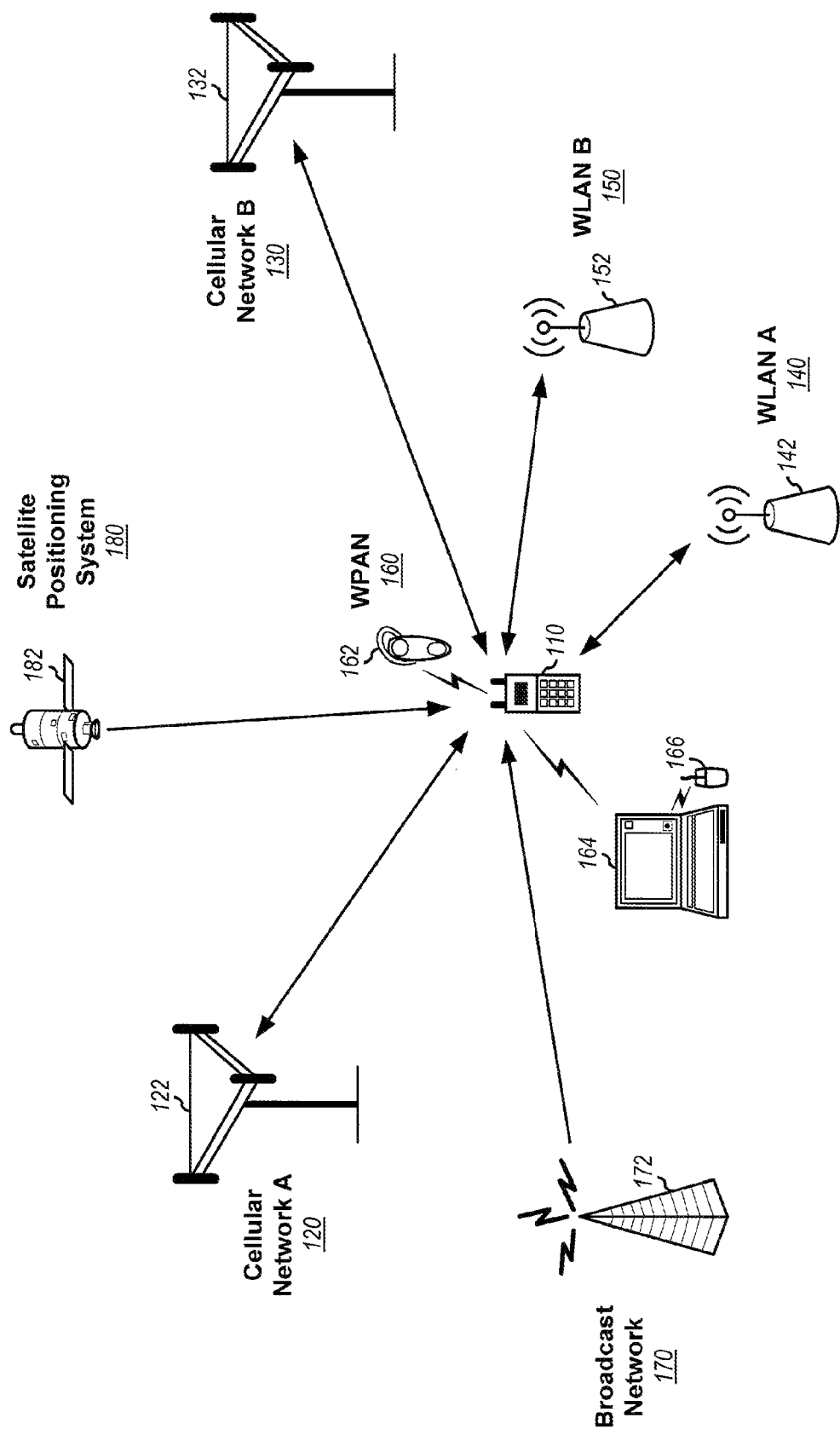
FIG. 1 shows a wireless device communicating with various wireless networks.

FIG. 1 shows a wireless communication device 110 capable of communicating with multiple wireless communication networks. These wireless networks may include one or more wireless wide area networks (WWANs) 120 and 130, one or more wireless local area networks (WLANs) 140 and 150, one or more wireless personal area networks (WPANs) 160, one or more broadcast networks 170, one or more satellite positioning systems 180, other networks and systems not shown in FIG. 1, or any combination thereof. The terms "network" and "system" are often used interchangeably. The WWANs may be cellular networks.

Cellular networks 120 and 130 may each be a CDMA, TDMA, FDMA, OFDMA, SC-FDMA, or some other network. A CDMA network may implement a radio technology or air interface such as Universal Terrestrial Radio Access (UTRA), cdma2000, etc. UTRA includes Wideband CDMA (WCDMA) and other variants of CDMA. cdma2000 covers IS-2000, IS-95, and IS-856 standards. IS-2000 is also referred to as CDMA 1X, and IS-856 is also referred to as Evolution-Data Optimized (EVDO). A TDMA network may implement a radio technology such as Global System for Mobile Communications (GSM), Digital Advanced Mobile Phone System (D-AMPS), etc. An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). Cellular network 120 may include a number of base stations 122 that can support bi-directional communication for wireless devices within their coverage. Similarly, cellular network 130 may include a number of base stations 132 that can support bi-directional communication for wireless devices within their coverage.

WLANs 140 and 150 may each implement a radio technology such as IEEE 802.11 (Wi-Fi), Hiperlan, etc. WLAN 140 may include one or more access points 142 that can support bi-directional communication. Similarly, WLAN 150 may include one or more access points 152 that can support bi-directional communication. WPAN 160 may implement a radio technology such as Bluetooth, IEEE 802.15, etc. WPAN 160 may support bi-directional communication for various devices such as wireless device 110, a headset 162, a computer 164, a mouse 166, etc.

Broadcast network 170 may be a television (TV) broadcast network, a frequency modulation (FM) broadcast network, a digital broadcast network, etc. A digital broadcast network may implement a radio technology such as MediaFLO™, Digital Video Broadcasting for Handhelds (DVB-H), Integrated Services Digital Broadcasting for Terrestrial Television Broadcasting (ISDB-T), Advanced Television Systems Committee—Mobile/Handheld (ATSC-M/H), etc. Broadcast network 170 may include one or more broadcast stations 172 that can support one-way communication.

Satellite positioning system 180 may be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, etc. Satellite positioning system 180 may include a number of satellites 182 that transmit signals used for positioning.

Wireless device 110 may be stationary or mobile and may also be referred to as a user equipment (UE), a mobile station, a mobile equipment, a terminal, an access terminal, a subscriber unit, a station, etc. Wireless device 110 may be a cellular phone, a personal digital assistant (PDA), a wireless modem, a handheld device, a laptop computer, a cordless phone, a wireless local loop (WLL) station, a smart phone, a netbook, a smartbook, a broadcast receiver, etc. Wireless device 110 may communicate two-way with cellular networks 120 and/or 130, WLANs 140 and/or 150, devices within WPAN 160, etc. Wireless device 110 may also receive signals from broadcast network 170, satellite positioning system 180, etc. In general, wireless device 110 may communicate with any number of wireless networks and systems at any given moment.

Figure 2:
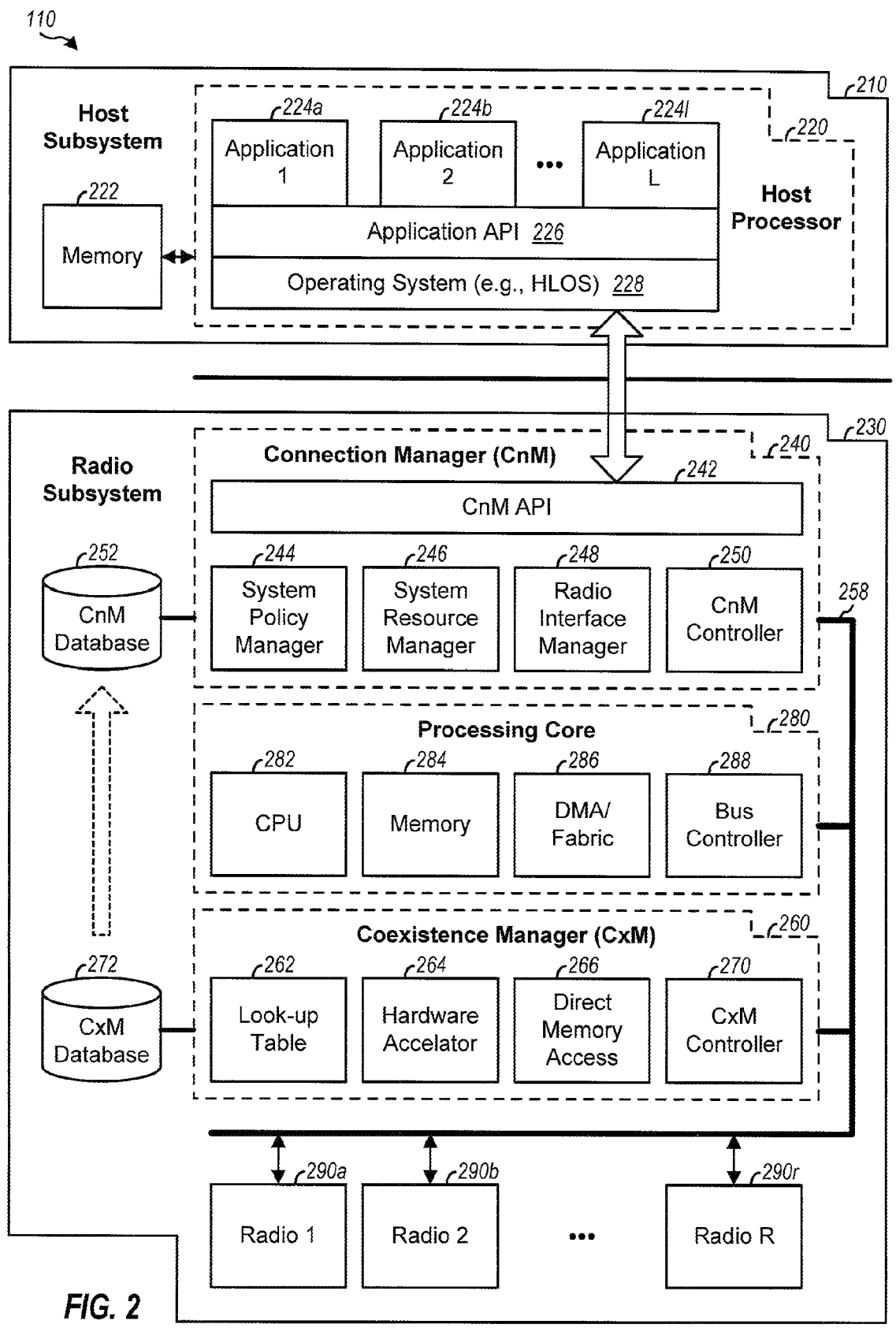
FIG. 2 shows a block diagram of the wireless device.

FIG. 2 shows a block diagram of a design of wireless device 110, which includes a host subsystem 210 and a radio subsystem 230. In the design shown in FIG. 2, host subsystem 210 includes a host processor 220 and a memory 222. Wireless device 110 may support L applications 224a through 224l, which may provide different communication services such as voice, packet data, video share, video telephony, email, broadcast reception, instant messaging, push-to-talk, etc. In general, L may be any value. Any one of the L applications 224 may be active at any given moment. An application programming interface (API) 226 may support communication between applications 224 and an operating system (OS) 228 for wireless device 110. Operating system 228 may control the operation of wireless device 110 and may be a high level operating system (HLOS) or some other operating system. Host processor 220 may execute the active applications and may also run the API and the operating system. Memory 222 may store program codes and data for host processor 220.

In the design shown in FIG. 2, radio subsystem 230 includes a connection manager (CnM) 240, a coexistence manager (CxM) 260, a processing core 280, a CnM database 252, a CxM database 272, and R radios 290a through 290r, where R may be any value. Radio subsystem 230 may be a modem chip, a modem chipset, a wireless data card, etc. The R radios 290 may be for 3GPP2 cellular networks (e.g., CDMA 1X, EVDO, etc.), 3GPP cellular networks (e.g., GSM, GPRS, EDGE, WCDMA/UMTS, LTE, etc.), WLANs, WiMAX networks, GPS, Bluetooth, broadcast networks, Near Field Communication (NFC), Radio Frequency Identification (RFID), etc.

Connection manager 240 may perform various functions to support communication for active applications via available radios. Within connection manager 240, a CnM API 242 may facilitate communication between connection manager 240 and coexistence manager 260 and applications 224, as described below. A system policy manager 244 may manage policies associated with the radios, activate and de-activate radios in response to events, and manage handoffs between wireless networks. The policies may be used to determine which radio(s) to use for any given application. System policy manager 244 may operate based on network operator rules, which may be provided via a preferred roaming list (PRL) in 3GPP2, a list of preferred public land mobile networks (PLMNs) in 3GPP, etc. A system resource manager 246 may interface with system policy manager 244 to perform resource management such as conflict resolution, power management, link quality of service (QoS), admission control, etc. A radio interface manager 248 may manage call, change phone settings, register/de-register supplementary services, and notify applications regarding call status, phone state/status, and service status. Radio interface manager 248 may also manage service continuity using Mobile Internet Protocol (MIP), neighbor channel measurements, better system detection, pre-authentication and security key exchange, and other functional units for voice and data services. Radio interface manager 248 may also support peer-to-peer communication between wireless device 110 and other wireless devices. A CnM controller 250 may be responsible for the overall control of connection manager 240. CnM controller 250 may communicate with applications 224 via CnM APIs to determine which applications are active, obtain the requirements of the active applications, and provide information on the available or selected radios. CnM controller 250 may also coordinate the operation of other managers and controllers within connection manager 240, e.g., through messages exchanged via a common bus 258.

Coexistence manager 260 may interface with radios 290 and may control the operation of the radios. Coexistence manager 260 may receive inputs from active radios and may control the operation of the active radios to mitigate interference between these radios and achieve good performance for as many radios as possible. Within coexistence manager 260, a CxM controller 270 may be responsible for the overall control of coexistence manager 260. A look-up table (LUT) 262 may be associated with (and interface with) CxM database 272 to retrieve pertinent parts of the database based on the current operating scenario. A hardware accelerator (HWA) 264 may provide efficient processing of certain functions and may use a direct memory access (DMA) module 266 to directly access a memory store.

Processor core 280 may perform processing for the units within radio subsystem 230. Within processing core 280, a central processing unit (CPU) 282 may perform processing as requested by connection manager 240 and coexistence manager 260. CPU 282 may also perform processing for data being transmitted or received via radios 290. The processing for each radio 290 may be dependent on the radio technology supported by that radio and may include encoding, decoding, modulation, demodulation, encryption, decryption, etc. Memory 284 may store program code and data for connection manager 240 and coexistence manager 260. A DMA/fabric controller 286 may support data transfer with local or external system memory or other subsystems. A bus controller 288 may coordinate communication via data bus 258.

In one design, processing core 280 may perform processing for connection manager 240 and coexistence manager 260, e.g., for functions related to radio selection, system selection, and handoff between radios. CPU 282 may be an embedded processor located within radio subsystem 230. CPU 282 and associated memory 284 can provide a single and centralized environment to host CnM and CxM functions. This may enable connection manager 240 to provide real-time management of all active radios in a localized environment. This may also enable connection manager 240 to provide a scalable infrastructure to support any number of radios. CPU 282 may be a low-power processor with lower required performance than conventional CPUs in order to provide power savings in executing CxM and CnM functions. Furthermore, CPU 282 may provide an "always on" environment so that connection manager 240 and coexistence manager 260 can be functional when needed. This "always on" functionality may be assured while simultaneously enabling CPU 282 to sleep when appropriate in order to reduce power consumption.

CxM database 272 may store an interference database, which may comprise information on performance of different combinations of radios in different operating scenarios. The interference database may be in the form of a color chart or some other format. The operation of radios may be controlled based on the interference database to obtain acceptable performance for the radios.

CnM database 252 may store various types of information that may be used to select radios for applications. For example, CnM database 252 may store (i) a profile database of profiles that may be used to obtain connectivity, (ii) a network database of information for different wireless networks (e.g., a PRL, a preferred PLMN list, etc.), (iii) a policy database of information used to select radios to provide connectivity for wireless device 110, (iv) a converted interference database of information used to select radios for applications based on the current operating scenario, and/or (v) other databases of other information for wireless device 110.

FIG. 2 shows an exemplary design of radio subsystem 230, connection manager 240, coexistence manager 260, and processing core 280 for wireless device 110. Radio subsystem 230, connection manager 240, coexistence manager 260, and processing core 280 may also include fewer, different, and/or additional managers, controllers, and databases. In general, radio subsystem 230 may include (i) any number of managers and controllers for any number of functions and (ii) any number of databases for any type of information that may be useful to support communication.

In one design, profiles may be used to provide connectivity for wireless device 110. A profile may contain preferences for specific actions that wireless device 110 should perform to obtain connectivity. For example, a profile may identify preferences for certain radios over other radios, preferences for a particular radio under certain conditions, etc. Different profiles may be defined by different entities such as a user, a network operator, an original equipment manufacturer (OEM) or wireless device manufacturer, etc. The profiles may allow for conformance to the requirements of the different entities.

A number of profiles may be defined. In one design, one or more of the following profiles may be defined:

User profile—store preferences for connectivity defined by the user,

Operator profile—store connectivity preferences defined by a network operator,

OEM profile—store connectivity preferences defined by an OEM,

Applications profile—store connectivity preferences for applications, and

Learned profile—store connectivity preferences determined based on learned patterns and behavior of wireless device 110.

A user profile may store preferences for connectivity defined by the user based on various considerations such as cost, privacy, battery usage, etc. The user-defined preferences may be used to select radios to provide connectivity for applications. For example, the user profile may select a home WLAN when the user is at home, may select a company WLAN when at work, and may switch off WLAN in the car to save battery power.

An operator profile may store preferences for connectivity defined by a network operator. The network operator may prefer wireless device 110 to use some radios over other radios when several radios are available within wireless device 110. For example, the network operator may prefer to route traffic data via a preferred network of the operator or to offload traffic data when an access point is available, e.g., in a WLAN of the network operator. The operator preferences may be defined based on a PRL for 3GPP2 networks, a preferred PLMN list for 3GPP networks, and/or a list of preferred wireless networks.

An OEM profile may store preferences for connectivity defined by an OEM or manufacturer of wireless device 110. The OEM profile may be defined based on capabilities of wireless device 110, which may be dependent on which specific radios are included in wireless device 110, the available resources in wireless device 110, etc. The available resources may be given by radio capabilities, processing capabilities, memory capacity, battery power, etc. The OEM profile may store rules/preferences based on the available resources. Different decisions may be made based on all of the rules in the OEM profile.

An applications profile may store preferences for connectivity for applications on wireless device 110. An application may have certain requirements (e.g., for QoS), and each radio may have certain capabilities. The preferences may be based on the requirements of the applications, the capabilities of the radios, and/or other factors. The preferences may be used to select the proper radios to provide connectivity for the applications.

A learned profile may store preferences for connectivity determined based on past activities or behavior of wireless device 110. Patterns and behaviors of wireless device 110 may be gathered and used to create a new profile or to update an existing profile. The learned profile may also be established by local conditions such as the location of wireless device 110.

Five types of profiles have been described above. Fewer, different, and/or additional profiles may also be defined and used to provide connectivity. A profile may be static and defined once, semi-static and changed once in a while, or dynamic and updated periodically or asynchronously. A profile may be updated by the user, other entities such as wireless device 110 via an internal learning entity, another user via a wired or wireless connection, the operator network, a service server, etc. A profile may be loaded into wireless device 110 automatically without user involvement or may require user approval for loading.

1. CnM-CxM Operation

In an aspect, connection manager 240 and coexistence manager 260 may cooperate to select radios for active applications such that good performance can be achieved. In one design, connection manager 240 may serve as a control entity for coexistence manager 260 and may control the operation of coexistence manager 260 to select radios and perform handoff between radios. In one design, coexistence manager 260 may be made aware of both single-radio and multiple-radio scenarios and may select one or more radios for the scenario under consideration. For example, coexistence manager 260 may be informed of a scenario in which multiple radios are part of the same communication thread, e.g., cellular plus Bluetooth as part of a voice call. Coexistence manager 260 may then select appropriate radios for the communication thread and may ensure proper concurrent operation of the selected radios.

Connection manager 240 may establish rules/parameters used to select radios. For example, the rules may relate to priorities of radios, resolutions between radios in case of conflict due to interference, etc. The rules may be defined based on the profiles and preferences for communication, requirements of the active applications, coexistence state of different combinations of radios, etc. The profiles and preferences may be stored in CnM database 252 and may be retrieved as needed. The requirements of applications 224 may relate to QoS, air interface, etc. An application may have certain QoS requirements, which may be supported by certain radio technologies. For example, a Videoshare application may have certain requirements that can be satisfied by EVDO. If a user leaves an EVDO network and enters a WLAN, then specific action may be taken for the Videoshare application up to and including disabling the application.

In one scenario, a single application may be active and may be assigned to and supported by a specific radio. In another scenario, multiple applications may be active concurrently and may have different requirements (e.g., for QoS) and preferred radios. In this scenario, the available radios may be prioritized based on the requirements of the active applications. QoS may be related to radio coexistence, since QoS of a particular radio may decrease when interference between radios increases. For both scenarios, connection manager 240 may select one or more appropriate radios such that the requirements of one or more active applications can be satisfied.

Figure 3:
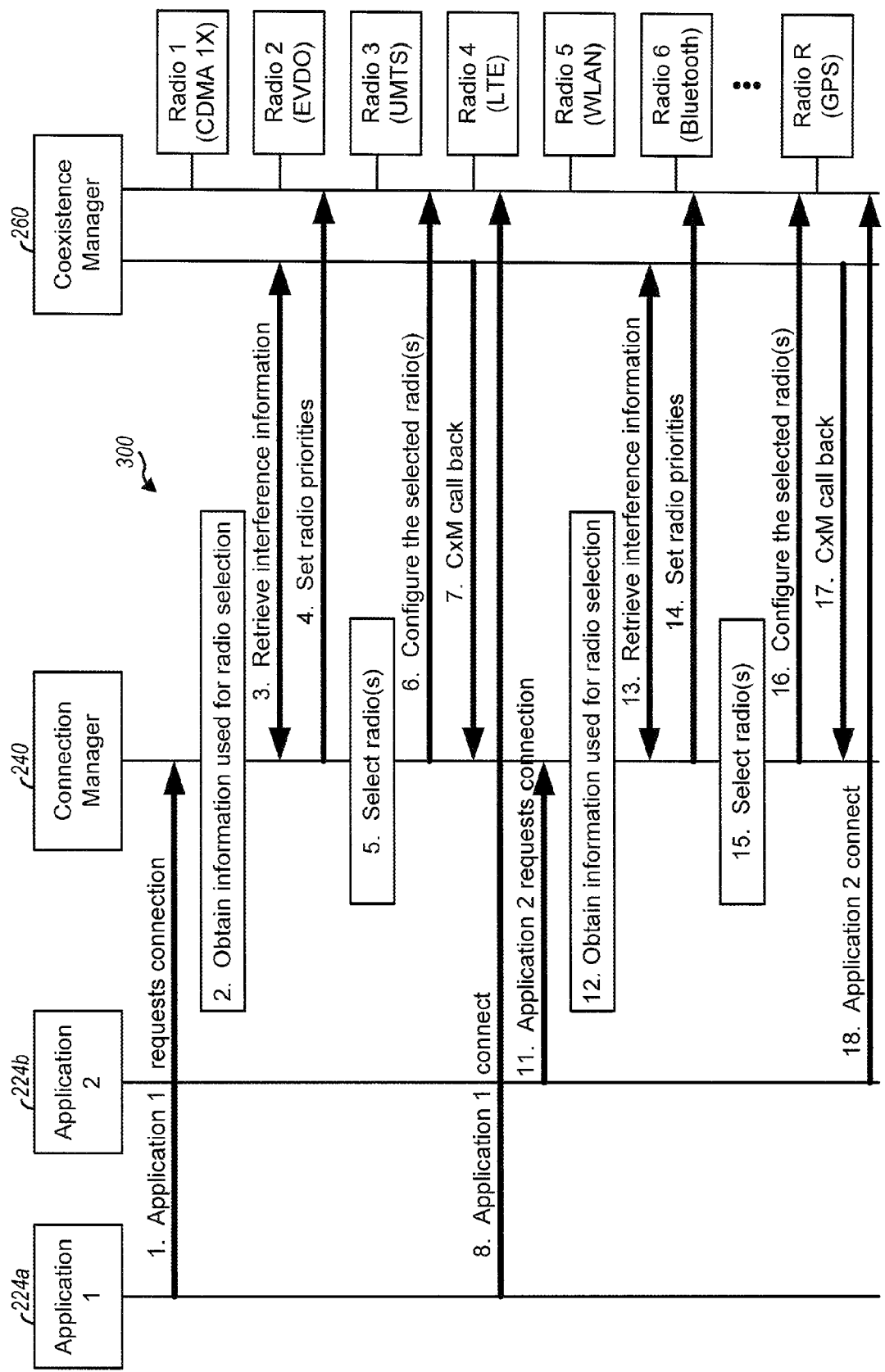
FIG. 3 shows a call flow for performing radio selection for applications.

FIG. 3 shows a design of a call flow 300 for performing radio selection for active applications. A first application 224a may become active and may send a connection request to connection manager 240 (step 1). Connection manager 240 may receive the connection request and may obtain information used for radio selection for application 224a (step 2). This radio selection information may comprise profiles and/or preferences applicable for application 224a, requirements of application 224a, status of wireless device 110, etc. Connection manager 240 may generate a list of radios that can be used for application 224a and possibly one or more preferred radios for application 224a based on the radio selection information. Connection manager 240 may retrieve interference information for radios currently available on wireless device 110 and/or requested radios for application 224a, including radios that may be in an "on" or "standby" state and may impact the local interference environment (step 3). The interference information may indicate interference conditions observed by the radios of interest and may be provided in various forms, as described below. The interference information may be obtained from the interference database maintained by coexistence manager 260.

Connection manager 240 may set the priorities of radios based on the radio selection information and the interference information (step 4). Connection manager 240 may then select one or more radios for application 224a based on the priorities of the radios and the available information (step 5). Connection manager 240 may communicate with coexistence manager 260 to configure the selected radio(s) to obtain the desired performance (step 6). Coexistence manager 260 may periodically monitor interference conditions for the selected radio(s) and may report back to connection manager 240 whenever the interference conditions change by predetermined amount (step 7). Application 224a may be connected to the selected radio(s) (step 8).

As an example, application 224a may be a Voice-over-Internet Protocol (VoIP) application that may request for the best system to connect in step 1. Connection manager 240 may determine that LTE at 2.5 GHz or CDMA 1X at 800 MHz can support the VoIP application in step 2. VoIP over LTE may be preferred by connection manager 240. However, WLAN at 2.4 GHz may be active at the moment, and the interference information from coexistence manager 260 in step 3 may indicate that LTE at 2.5 GHz is heavily interfered by WLAN at 2.4 GHz. Connection manager 240 may then select CDMA 1X at 800 GHz for the VoIP application in step 5 in order to avoid interference and provide better user experience. Alternatively, connection manager 240 may attempt to mitigate interference from WLAN at 2.4 GHz (if possible) and may then select LTE at 2.5 GHz for the VoIP application. In either case, the most suitable radio may be selected for the VoIP application based on the radio selection information for the VoIP application and the interference information.

At a later time, a second application 224b may become active and may send a connection request to connection manager 240. The steps described above for application 224a may be repeated for application 224b. However, the interference information obtained from coexistence manager 260 may be dependent on radio(s) selected for other active applications as well as radios that can be used for application 224b. One or more radio(s) may be selected for application 224b from among the available radios based on the radio selection information for application 224b and the interference information. Application 224b may be connected to its selected radio(s).

FIG. 3 shows an example in which two applications sequentially request for radio connections. In general, any number of applications may request for radio connections. The requests may be received and processed sequentially as shown in FIG. 3 or in parallel. Parallel processing may allow for evaluation of the requirements of all applications concurrently, so that radios can be selected and assigned in a more efficient manner.

2. Converted Interference Database

In another aspect, one or more interference databases may be used by connection manager 240 and coexistence manager 260 to select radios for active applications. In one design, coexistence manager 260 may generate an interference database (e.g., a color chart) for a given multi-radio platform, which may be defined by all radios supported by wireless device 110. The interference database may be used to select radios and to reduce interference between active radios operating concurrently. In one design, the interference database may be updated frequently (e.g., every millisecond or less) based on the current interference conditions. Connection manager 240 may be a client entity for the interference database, which may be used to determine which radio(s) to select at a given time.

In one design, the interference database may be converted to a converted interference database, which may be more suitable for use for radio selection for initial connection and/or handoff. Radios are typically selected in a semi-static manner, and changes may be made relatively infrequently (e.g., on the order of minutes or hours instead of milliseconds). The conversion may be performed (e.g., by CPU 282 within processing core 280) in various manners. In one design, the conversion may be implemented with a moving average filter of a suitable time constant (e.g., approximately one second). This design may provide a more accurate indication of interference conditions observed by the radios. In one design, the interference database may be converted from one format (e.g., with decibel (dB) values) to another format (e.g., with color coded indicators, or throughput values, and/or other information). This design may simplify the use of the interference information for radio selection.

In one design, the conversion may be performed periodically at a predetermined rate, which may be set by connection manager 240 or negotiated between connection manager 240 and coexistence manager 260. In another design, a callback or alert mechanism may be used to allow coexistence manager 260 to provide requested actions to connection manager 240. For example, coexistence manager 260 may alert connection manager 240 when interference conditions between two radios X and Y meet predefined criteria.

FIG. 4 shows a design of a color chart 400, which is one design of an interference database used to select radios. In color chart 400, the horizontal axis may be for transmitter radios and may cover different frequency bands (instead of different frequency channels). A band may cover a number of frequency channels. The specific number of frequency channels in each band may be dependent on the radio technology, the band, etc. The vertical axis may be for receiver radios and may also cover different bands.

In the design shown in FIG. 4, color chart 400 includes six cells for each band combination covering a specific band for a transmitter radio and a specific band for a receiver radio. For a given band combination, three cells in the left column provide performance for a sensitivity scenario (Sen), and three cells in the right column provide performance for a nominal scenario (Nom). The two cells in the top row indicate the percentage of channel combinations with acceptable performance (designated by green color), the two cells in the middle row indicate the percentage of channel combinations with marginal performance (designated by yellow color), and the two cells in the bottom row indicate the percentage of channel combinations with unacceptable performance (designated by red color). For example, in a block 410 covering a Bluetooth transmitter in the 2.4 GHz band and an LTE receiver in the 2.6 GHz band, 47 percent of all frequency channel combinations have acceptable performance for the sensitivity scenario, 10 percent of all frequency channel combinations have marginal performance, and 43 percent of all frequency channel combinations have unacceptable performance. The information in color chart 400 may be obtained by (i) determining the performance (e.g., acceptable, marginal, or unacceptable) for each frequency channel combination for a given scenario (e.g., sensitivity or nominal) and (ii) determining the percentage of frequency channels for each performance level. In general, any number of performance levels may be defined, and color chart 400 may provide the percentage of channel combinations for each performance level.

In another design, a color chart may include a number of cells for a number of operating states for different transmitter and receiver radios. A radio may have one or more configurable parameters that may be adjusted to mitigate interference from the radio and/or to improve the performance of the radio. A configurable parameter may be for a physical component within the radio, such as an amplifier, a filter, an antenna, an antenna array, etc. A configurable parameter may also be for an operational parameter such as a transmit power level, a frequency channel, a traffic channel, a scheduled period, etc. A received power level may also be a configurable parameter if it can be varied, e.g., by selecting different antennas and/or more antennas. Each configurable parameter may be set to one of multiple possible settings/values applicable for that parameter. The radio may have an operating state, which may be defined by a particular setting for each configurable parameter. A configurable parameter may also be referred to as a "knob", a configurable parameter setting may also be referred to as a "knob setting", and an operating state may also be referred to as a "knob state".

The color chart may include a set of columns for each frequency channel on which a transmitter radio can operate. Each column set may include a number of columns for different operating states of the transmitter radio. The color chart may also include a set of rows for each frequency channel on which a receiver radio can operate. Each row set may include a number of rows for different operating states of the receiver radio. A cell may be defined for each unique combination of operating states of the transmitter and receiver radios. Cell (i, j) may correspond to operating state i for the transmitter radio and operating state j for the receiver radio. Cell (i, j) may be filled with the performance level (e.g., acceptable, marginal, or unacceptable) for the receiver radio with the transmitter radio in operating state i and the receiver radio in operating state j. The operating state of the transmitter radio and/or the operating state of the receiver radio may be varied, as needed, to obtain the desired performance.

Two exemplary color charts that may be used for the interference database are described above. Information regarding interference between radios may also be captured and presented in a color chart or an interference database in other manners, e.g., quantized in other ways, presented using other formats or structures, etc.

Figure 5:
FIG. 5 shows an exemplary converted color chart.

FIG. 5 shows a design of a converted color chart 500, which is one design of a converted interference database used to select radios. In color chart 500, the horizontal axis may cover different frequency bands for transmitter radios, and the vertical axis may cover different bands for receiver radios. In the design shown in FIG. 5, converted color chart 500 includes one cell for each band combination covering a specific frequency band for a transmitter radio and a specific frequency band for a receiver radio. The cell for a given band combination may indicate whether the performance of the transmitter and receiver radios for that band combination is acceptable (green), marginal (yellow), or unacceptable (red). This performance may be obtained by averaging the performance of the transmitter and receiver radios across different channels covered by the band combination and/or over a suitable time duration.

FIG. 5 shows an exemplary converted color chart, which may be based on the color chart shown in FIG. 4. In general, the conversion may be performed in various manners and may be dependent on the format of the original color chart.

In one design, the converted interference database may be provided in a numeric form or a coded form. The numeric form may be provided in units of dB and may indicate the amount of interference (e.g., "+5 dB" for interference desense). The coded form may be provided by different indicators (e.g., "green", "yellow", and "red" indicators). The indicators may be defined based on an interference metric, e.g., in accordance with certain profile settings. For example, a green indicator may indicate "acceptable" performance or that a corresponding radio combination is not impacted by radio interference. A yellow indicator may indicate "marginal" performance within the operating parameters of connection manager 240 in its profile database. A red indicator may indicate "unacceptable" performance or "severe" radio interference. In this case, connection manager 240 may select an alternative radio if possible or take other actions such as notifying the user.

Figure 6A:
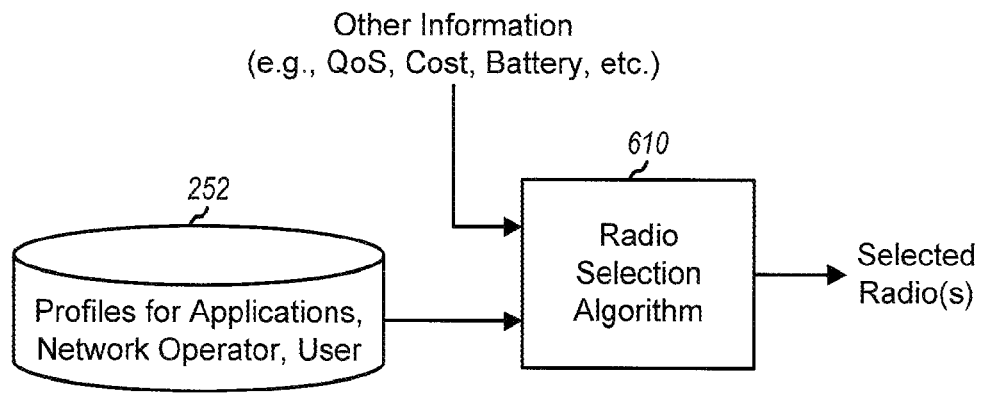
FIG. 6A shows radio selection without utilizing interference information.

FIG. 6A shows a design of radio selection by connection manager 240 without utilizing interference information. A radio selection algorithm 610 (which may be implemented by connection manager 240) may receive various inputs such as (i) profiles for applications, network operator, and user from CnM database 252 and (ii) other information such as requirements of active applications (e.g., for QoS), cost, available battery power, etc. Radio selection algorithm 610 may determine operating rules based on all of the inputs. The operating rules may be used to select radios, to map active applications to the selected radios, etc. Radio selection algorithm 610 may then select one or more best radios for one or more active applications based on the operating rules.

Figure 6B:
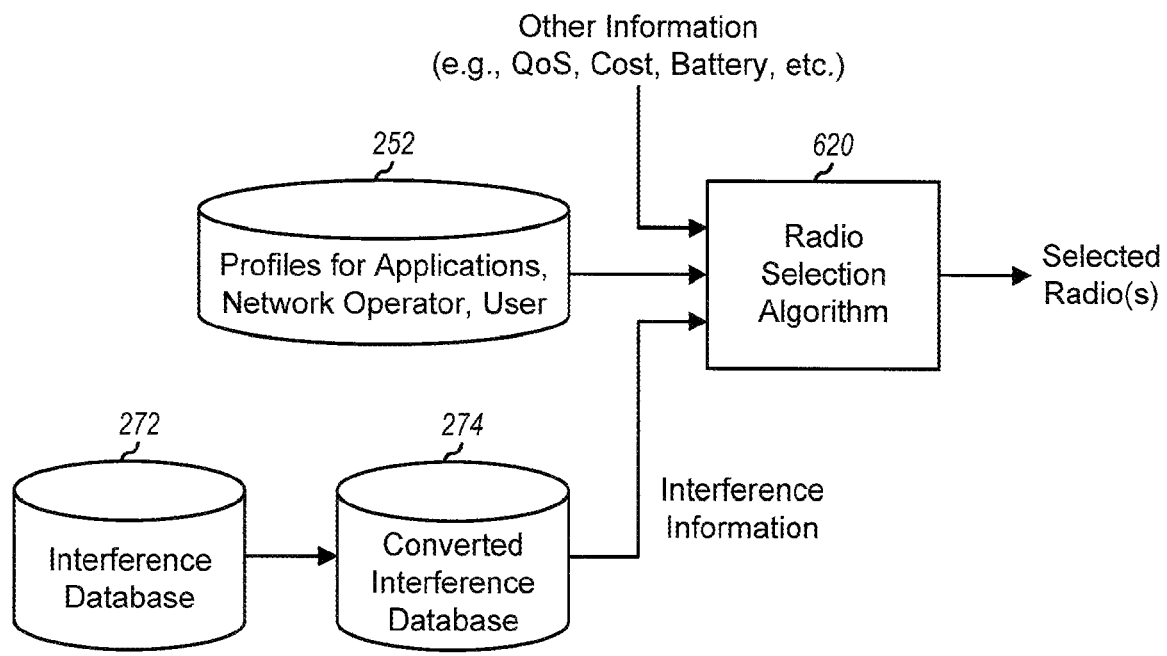
FIG. 6B shows radio selection by utilizing interference information.

FIG. 6B shows a design of radio selection by connection manager 240 by utilizing interference information. Coexistence manager 260 may maintain an interference database within CxM database 272 and may update the interference database periodically. All or a portion of the interference database may be converted to a converted interference database 274, e.g., when requested by connection manager 240, or when triggered by certain events, etc. A radio selection algorithm 620 (which may be implemented by connection manager 240) may receive various inputs such as (i) profiles for applications, network operator, and user from CnM database 252, (ii) interference information from converted interference database 274, and (iii) other information such as requirements of active applications (e.g., for QoS), cost, available battery power, etc. Radio selection algorithm 620 may determine operating rules based on all of the inputs and may select one or more best radios for one or more active applications based on the operating rules. Connection manager 240 may utilize the interference information to improve the selection of radio(s), e.g., to select radio(s) that will not cause high interference within wireless device 110 or to neighboring devices (e.g., a Bluetooth headset).

Figure 7:
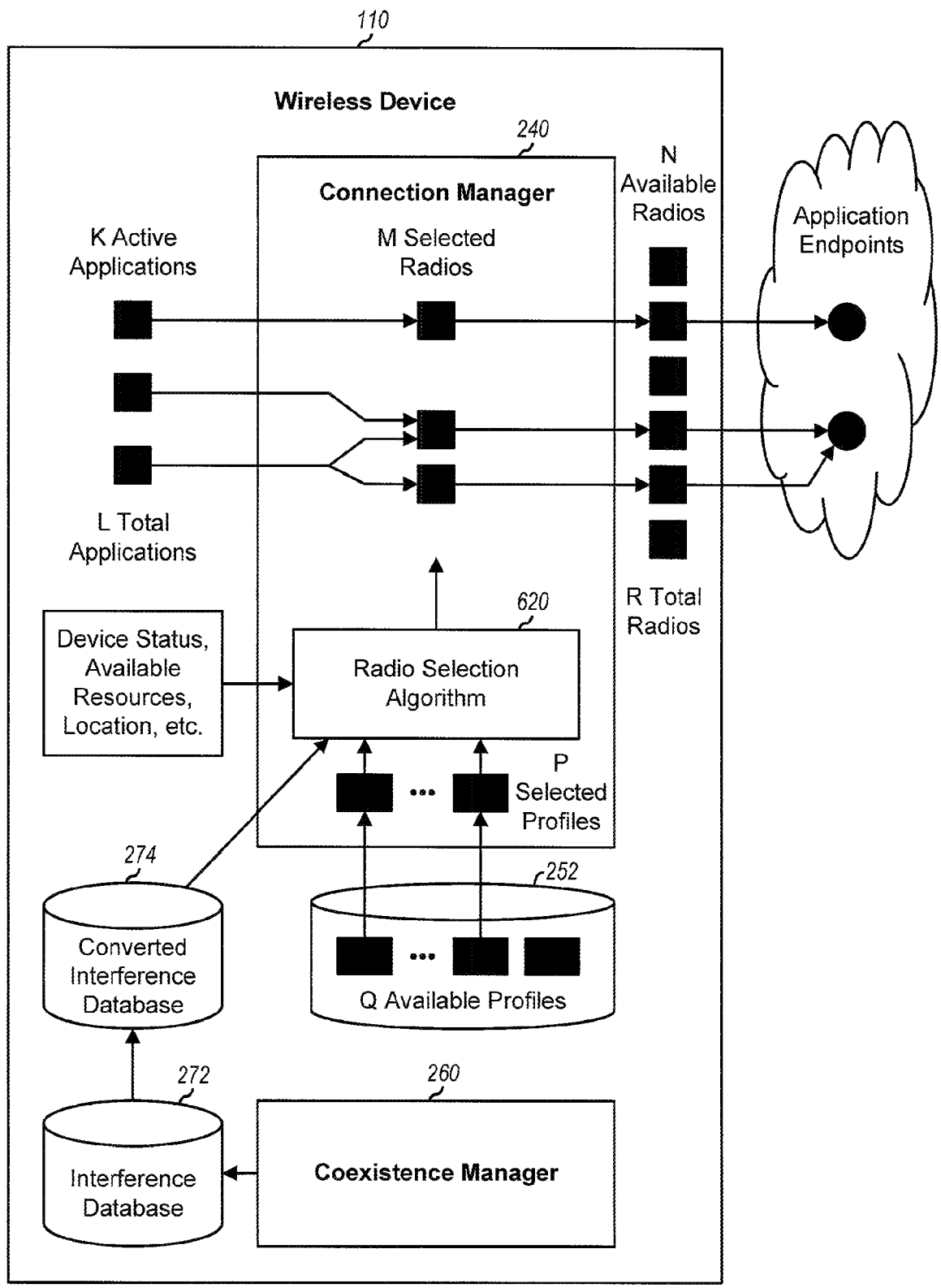
FIG. 7 shows interaction between various entities for radio selection.

FIG. 7 shows the operation of connection manager 240 and coexistence manager 260 to support radio selection. K applications may be active among L total applications on wireless device 110, where K≧1. Connection manager 240 may receive one or more connection requests from the K active applications. Connection manager 240 may determine that P profiles are applicable among the Q total profiles, where P and Q may be any values. Connection manager 240 may also receive interference information for N available radios among R total radios, where N>1. Connection manager 240 may also receive information indicative of the operating state, the available resources, and/or the location of wireless device 110. Connection manager 240 may determine operating rules based on the P selected profiles, the interference information, and other information for wireless device 110.

Connection manager 240 may select M of the N available radios to provide connectivity for the K active applications, where M≧1. Connection manager 240 may then map the K active applications to the M selected radios based on the operating rules. In the example shown in FIG. 7, a first active application may be mapped to a first selected radio, a second active application may be mapped to a second selected radio, and a third active application may be mapped to the second selected radio and a third selected radio based on the operating rules. Each active application may communicate with any entity to obtain the desired communication service. The endpoints for the applications are shown in the 'cloud', which may be the Internet.

The active applications may change. Furthermore, one or more selected radios may no longer be available (e.g., due to mobility) and/or other radios may become available or may be more preferred. Coexistence manager 260 may update the interference database and the converted interference database due to changes in the available radios and the radio environment. Connection manager 240 may update the selected radios due to changes in the active applications, the interference information, the available radios, the applicable profiles, the device operating state, the available resources, and/or other factors.

In one design, radio selection may be performed as follows. An operating state of each active radio may be sampled and stored at a given time instance. This information may be used to look up one or more values in the interference database, which may return a coexistence metric or color, e.g., an amount of desense (in dB) for a receiver radio. A decision making process may be initiated, and knobs of radios may be varied in order to improve the coexistence metric. These steps may be repeated iteratively until a desired coexistence metric is obtained.

In one design that may be more hardware-centric, some or all of the steps described above may be performed in hardware (e.g., by a programmable state machine or a hardware accelerator) rather than in software. In the hardware-centric design, look-up table 262 in FIG. 2 may store a database that may be a smaller version of the larger interference database in CxM database 272. Look-up table 262 may be implemented on a small memory that may be available to only the affected radios. Look-up table 262 may be accessed by a state machine via configurable parameters/knobs using a suitable addressing scheme and may provide coexistence metric(s). The state machine may vary the knob settings of radios and may access look-up table 262 iteratively until the desired result is obtained. DMA module 266 may provide data paths to local and/or external memory to facilitate the above operation.

In one design that may be more software-centric, a software-based module may programmatically vary knob settings, execute table lookups, and iteratively drive to the desired result.

3. APIs

In yet another aspect, connection manager 240 may communicate with other entities via APIs. In one design, an API may be defined to support communication between connection manager 240 and applications 224 and other entities above connection manager 240. This API may allow the other entities to access information available to connection manager 240 and/or coexistence manager 260. In one design, an API may be defined to support communication between connection manager 240 and coexistence manager 260. This API may enable easy access to information maintained by coexistence manager 260.

For example, connection manager 240 may request and/or receive converted interference database, parameters for the interference database, and/or other information via the API. The API between connection manager 240 and coexistence manager 260 may be defined in a flexible manner based on the operation of connection manager 240. Some API calls may be for an "as required" mode and may allow connection manager 240 to request for information and receive it immediately from coexistence manager 260. Some API calls may be for a "on change" mode and may allow connection manager 240 to receive information from coexistence manager 260 when triggered by certain conditions, e.g., a specified change. The "on change" mode may be referred to as a "callback function" or a "restricted callback," where "restricted" may refer to specific conditions for callback.

In one design, a set of API calls may be defined to configure policies/profiles, e.g., as shown in Table 1. An application or connection manager 240 may use the API calls in this set to retrieve or update the profiles in CnM database 252. For example, an API call may be originated to obtain an applications-to-radios ordered list conveying the preferred mapping of applications to radios.

TABLE 1

Policy/Profile Configuration API

| API Call | Description |
|---|---|
| UpdatePolicyConfig | Update the CnM policy/profile database, e.g., at home, at work, etc. |
| GetPolicyConfig | Retrieve active policies/profiles used by a specific session, which may be the duration in which an active application uses a specific radio. |
| UpdateCxMPolicyConfig | Update the CxM policy/profile database, e.g., WLAN-LTE channel number. |
| GetCxMPolicyConfig | Retrieve active CxM policies/profiles used by a specific session. |

In one design, a set of API calls may be defined for actions related to connectivity, e.g., as shown in Table 2. Connection manager 240 may use the API calls in this set to establish application sessions using one or more radio connections. For example, connection manager 240 may retrieve interference information for different radio combinations, set the priorities of radios, select and configure the selected radios, establish or release radio connections, etc.

TABLE 2

Connectivity API

| API Call | Description |
|---|---|
| GetCxM_IDB | Retrieve interference information for specific radio combinations from the interference database. |
| GetCxM_IDBCallback | Register to receive callback of interference information when triggered by specified events such as change of interference conditions. |
| CreateSession | Create an application connection session. |
| CloseSession | Close an application connection session. |
| GetFirstCandidateConnection | Retrieve a first candidate radio from a priority list for a requested connection. |
| GetNextCandidateConnection | Retrieve the next candidate radio from the priority list for the requested connection. |
| AcquireConnection | Establish a radio connection. |
| ReleaseConnection | Release a radio connection. |

In one design, a set of API calls may be defined for configuration of radios, e.g., as shown in Table 3. Connection manager 240 may use the API calls in this set to retrieve or update the configuration of radios, e.g., for bandwidth, latency, QoS, etc.

TABLE 3

Radio Configuration API

| API Call | Description |
|---|---|
| AddConnectionConfig | Add configuration parameters for a specified radio. |
| UpdateConnectionConfig | Update configuration parameters for a specified radio. |
| GetConnectionConfig | Retrieve configuration parameters for a specific radio. |

TABLE 3-continued

Radio Configuration API

| API Call | Description |
|---|---|
| SetRequirements | Set requirements for a specific radio from a profile database. |
| SetPreferences | Set preference for an application to a list of radios. |
| SetPriority | Set priority for an application to a list of radios. |

In one design, a set of API calls may be defined to obtain connection status and support callback/notification, e.g., as shown in Table 4. Connection manager 240 may use the API calls in this set to register for callback notifications on status of radios, e.g., to be notified when a radio degrades below a particular level.

TABLE 4

Connection Status and Callback/Notification API

| API Call | Description |
|---|---|
| GetCxM_IDBNotification | Obtain interference information from the interference database immediately. |
| GetCxM_IDBNotificationCallback | Obtain interference information via callback when status of radios changes. |
| GetNotification | Register for callback of notifications. |
| GetConnection_DetailsByName | Retrieve connection details in reference to a specific connection name. |
| GetConnection_DetailsBySession | Retrieve connection details in reference to a specific connection session. |

Some exemplary API calls that may be used for communication with connection manager 240 and coexistence manager 260 have been described above. Other API calls may also be defined for communication with connection manager 240 and coexistence manager 260, e.g., to support additional functionalities.

Figure 8:
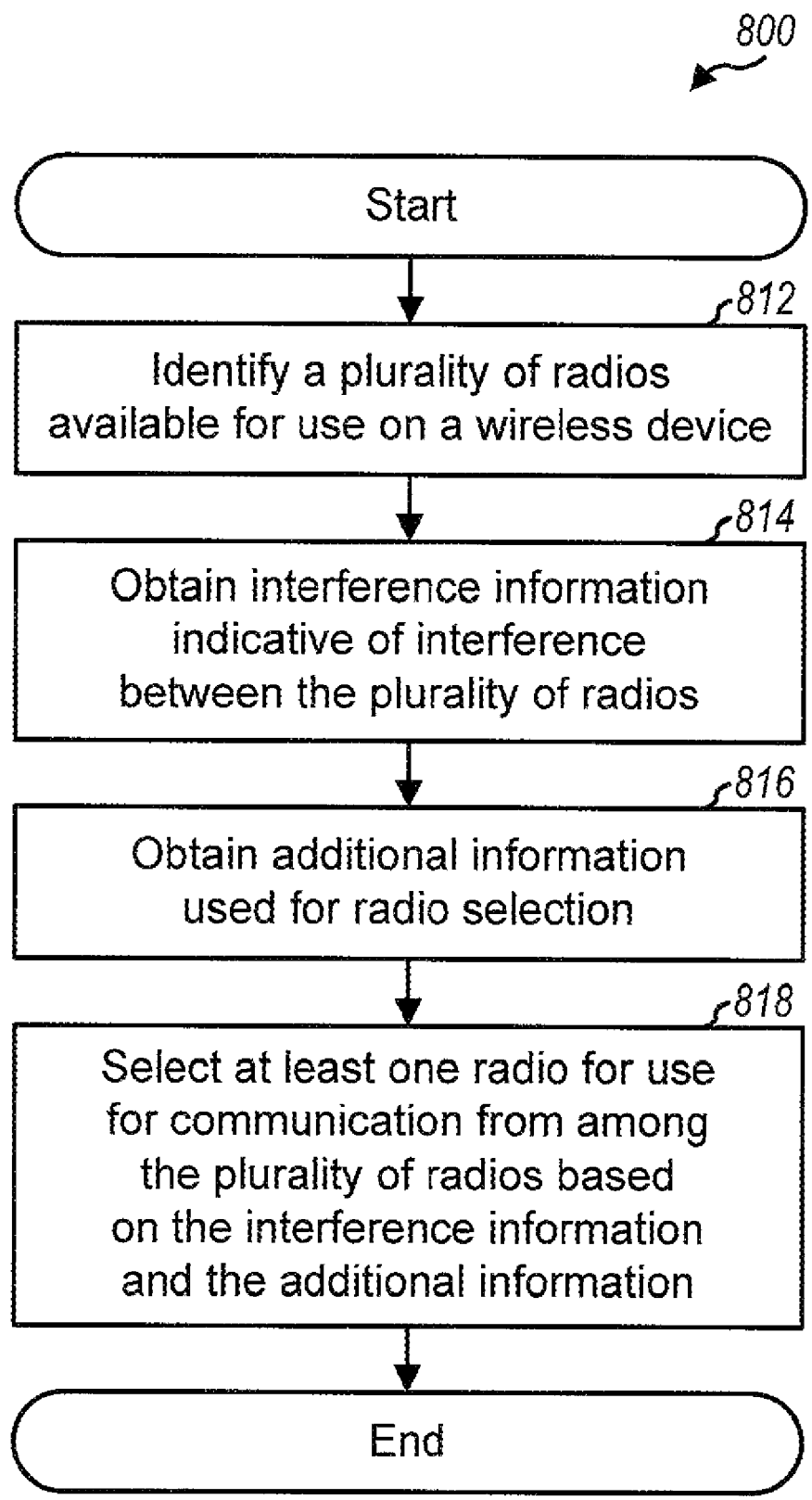
FIG. 8 shows a process for performing radio selection.

FIG. 8 shows a design of a process 800 for performing radio selection. Process 800 may be performed by one or more entities within a wireless device. A plurality of radios available for use on the wireless device may be identified (block 812). Interference information indicative of interference between the plurality of radios may be obtained (block 814). Additional information used for radio selection may also be obtained (block 816). At least one radio may be selected for use for communication from among the plurality of radios based on the interference information and the additional information (block 818).

The additional information may comprise information for at least one communication profile (e.g., for applications, a network operator, a user, etc.), or at least one communication preference, or requirements of at least one application, or capabilities of the plurality of radios, or cost, or available battery power on the wireless device, or some other information, or a combination thereof. In one design of block 816, at least one requirement of at least one active application may be obtained and used to select the at least one radio. The at least one requirement may comprise at least one QoS requirement (e.g., delay requirements), at least one throughput requirement, some other requirements, or a combination thereof. In another design, QoS capabilities of the plurality of radios may be obtained and used to determine the priorities of the radios. The at least one radio may be selected based further on the priorities of the plurality of radios. In general, one or more rules may be determined based on the interference information and the additional information and may be used to select the at least one radio.

In one design, the interference information may be obtained based on an interference database storing information on interference conditions for a set of radios. The information on interference conditions for the set of radios may be determined empirically, or measured by the wireless device, or downloaded from an external source, or a combination thereof. In one design, the interference database may be updated periodically (e.g., at a rate of every second or less) to reflect current interference conditions for the available radios.

In one design, the interference database may be converted to a converted interference database, and the interference information may be obtained based on the converted interference database. The interference database may store information in a first form. The converted interference database may store information in a second form, which may be different from the first form. In general, each interference database may include numeric form indicators (e.g., dB values, throughput values, etc.), or coded form indicators (e.g., green, yellow, and red), or some other indicators, or combination thereof. The second form may be more readily used for radio selection. The conversion may be based on a moving average filter and/or some other function of the first form to obtain the second form. The conversion may be performed when needed (e.g., when radio selection is performed), or periodically at a predetermined rate, and/or when interference conditions for the set of radios meet predefined criteria.

The interference information may be used to select radios and/or to control the operation of the radios to obtain good performance. In one design, a radio for which the interference information indicates acceptable interference impact between the radio and remaining radios may be selected for use. A radio for which the interference information indicates unacceptable interference impact between the radio and at least one other radio may not be selected. Alternatively, the operation of one or more radios may be altered (e.g., by changing frequency, transmit power level, etc.) to mitigate interference between radios.

In one design, a first entity (e.g., a connection manager) may obtain the interference information from a second entity (e.g., a coexistence manager) and may select the at least one radio. The first entity may send a request for interference information to the second entity. The second entity may immediately send the interference information in response to the request. Additionally or alternatively, the second entity may send the interference information when changes in interference conditions meet predefined criteria. The first and second entities may also interact in other manners to perform radio selection.

In one design, the first and second entities may communicate via API to obtain the interference information, or to control parameters of the interference database, and/or for other purposes. In one design, the first entity may communicate with at least one entity above the first entity via API obtain at least some of the additional information used for radio selection. The API for each case may allow different entities to retrieve information from each other and/or to control the operation of another entity.

In one design, processing for the first and second entities may be performed by an embedded dedicated processor (e.g., CPU 282 in FIG. 2) on the wireless device. The steps in FIG. 8 may thus be performed by the dedicated processor. In other designs, the steps in FIG. 8 may be performed by one or more processors, which may be located anywhere on the wireless device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Headings are included herein for reference and to aid in locating certain sections. These headings are not intended to limit the scope of the concepts described therein under, and these concepts may have applicability in other sections throughout the entire specification.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   identifying a plurality of radios defined within a mobile device that are available for use;
   obtaining interference information indicative of interference between the plurality of radios;
   obtaining additional information used for radio selection; and
   selecting at least one radio of the plurality of radios for communicating based at least in part on the interference information and the additional information.

2. The method of claim 1, wherein the additional information comprises information for at least one communication profile, at least one communication preference, requirements of at least one application, capabilities of the plurality of radios, cost, available battery power, or a combination thereof.

3. The method of claim 1, wherein the obtaining additional information comprises determining at least one requirement of at least one active application, and wherein selecting the at least one radio comprises selecting the at least one radio based further on the at least one requirement of the at least one active application.

4. The method of claim 3, wherein the at least one requirement of the at least one active application comprises at least one quality-of-service (QoS) requirement, and/or at least one throughput requirement.

5. The method of claim 1, wherein the selecting at least one radio comprises
   determining priorities of the plurality of radios based on quality-of-service (QoS) capabilities of each of the plurality of radios, and
   selecting the at least one radio based further on the priorities of the plurality of radios.

6. The method of claim 1, wherein the obtaining interference information comprises obtaining the interference information based on an interference database storing information on interference conditions for a set of radios.

7. The method of claim 6, wherein the information on interference conditions for the set of radios is determined empirically, measured by a wireless device, downloaded from an external source, or a combination thereof.

8. The method of claim 6, wherein the interference database is updated at a rate of every second or less.

9. The method of claim 6, wherein the interference database includes numeric form indicators, and/or coded form indicators.

10. The method of claim 6, further comprising:
    converting the interference database to a converted interference database, wherein the interference information is obtained based on the convened interference database.

11. The method of claim 10, wherein the interference database stores information in a first form, and wherein the converted interference database stores information in a second form different from the first form.

12. The method of claim 11, wherein the second form comprises color coded indicators, and/or throughput values.

13. The method of claim 10, wherein the converting comprises converting the interference database to the converted interference database based on a moving average filter.

14. The method of claim 10, wherein the converting comprises converting the interference database to the converted interference database when an interference condition for at least one radio is within a threshold.

15. The method of claim 1, wherein the interference information is obtained by a first entity from a second entity, and wherein the at least one radio is selected by the first entity.

16. The method of claim 15, wherein the obtaining interference information comprises
    transmitting a request for interference information from the first entity to the second entity, and
    receiving the interference information transmitted by the second entity in response to the request.

17. The method of claim 15, wherein the obtaining interference information comprises receiving the interference information transmitted by the second entity when changes in interference conditions are within a threshold.

18. The method of claim 1, wherein, the selecting at least one radio comprises
    selecting a radio for which the interference information indicates acceptable interference between the radio and remaining ones of the plurality of radios.

19. The method of claim 1, wherein the selecting at least one radio comprises
    avoiding selection of a radio for which the interference information indicates unacceptable interference between the radio and at least one other radio among the plurality of radios.

20. The method of claim 15, further comprising:
    communicating between the first entity and the second entity via an application programming interface (API) to obtain the interference information.

21. The method of claim 15, further comprising:
    communicating between the first entity and the second entity via an application programming interface (API) to control parameters of an interference database maintained by the second entity.

22. The method of claim 15, further comprising:
    communicating between the first entity and at least one entity above the first entity via an application programming interface (API) to obtain at least some of the additional information used for radio selection.

23. The method of claim 1, Wherein the identifying the plurality of radios, the obtaining interference information, the obtaining additional information, and the selecting at least one radio are performed by an embedded dedicated processor on a wireless device.

24. An apparatus for wireless communication, comprising:
means for identifying a plurality of radios defined within a mobile device that are available for use;
means for obtaining interference information indicative of interference between the plurality of radios;
means for obtaining additional information used for radio selection; and
means for selecting at least one radio of the plurality of radios for communicating based at least in part on the interference information and the additional information.

25. The apparatus of claim 24, wherein the means for obtaining additional information comprises means for determining at least one requirement of at least one active application, and wherein the the means for selecting the at least one radio is based further on the at least one requirement of the at least one active application.

26. The apparatus of claim 24, wherein the means for selecting at least one radio comprises means for determining priorities of the plurality of radios based on quality-of-service (QoS) capabilities of each of the plurality of radios, and
the means for selecting the at least one radio is based further on the priorities of the plurality of radios.

27. The apparatus of claim 24, wherein the means for obtaining interference information comprises means for obtaining the interference information based on an interference database storing information on interference conditions for a set of radios.

28. The apparatus of claim 27, further comprising:
means for converting the interference database to a converted interference database, wherein the interference information is obtained based on the converted interference database.

29. The apparatus of claim 24, wherein the interference information is obtained by a first entity from a second entity, wherein the at least one radio is selected by the first entity, and wherein the means for obtaining interference information comprises
means for transmitting a request for interference information from the first entity to the second entity, and
means for receiving the interference information transmitted by the second entity in response to the request.

30. An apparatus for wireless communication, comprising:
at least one processor configured:
to identify a plurality of radios defined within a mobile device are available for use,
to obtain interference information indicative of interference between the plurality of radios, to obtain additional information used for radio selection, and
to select at least one radio of the plurality of radios for communicating based at least in part on the interference information and the additional information; and
a memory coupled to the at least one processor.

31. The apparatus of claim 30, wherein the at least one processor is further configured:
to determine at least one requirement of at least one active application, and
to select the at least one radio based further on the at least one requirement of the at least one active application.

32. The apparatus of claim 30, wherein the at least one processor is further configured:
to determine priorities of the plurality of radios based on quality-of-service (QoS) capabilities of the plurality of radios, and
to select the at least one radio based further on the priorities of the plurality of radios.

33. The apparatus of claim 30, wherein the at least one processor is further configured to obtain the interference information based on an interference database storing information on interference conditions for a set of radios.

34. The apparatus of claim 33, wherein the at least one processor is further configured:
to convert the interference database to a converted interference database, and
to obtain the interference information based on the converted interference database.

35. The apparatus of claim 30, wherein the interference information is obtained by a first entity from a second entity, wherein the at least one radio is selected by the first entity, and wherein the at least one processor is further configured:
to send a request for interference information from the first entity to the second entity, and
to receive the interference information sent by the second entity in response to the request.

36. A computer program product, comprising:
a non-transitory computer-readable medium having non-transitory program code recorded thereon, the program code comprising:
program code to identify a plurality of radios defined within a mobile device that are available for use,
program code to obtain interference information indicative of interference between the plurality of radios,
program code to obtain additional information used for radio selection, and
program code to select at least one radio of the plurality of radios for communicating based at least in part on the interference information and the additional information.

* * * * *